Patented Mar. 20, 1923.

1,449,094

UNITED STATES PATENT OFFICE.

ALBERT E. GREENE, OF SEATTLE, WASHINGTON.

ELECTRIC IRON PROCESS.

No Drawing. Original application filed May 3, 1916, Serial No. 95,107. Divided and this application filed March 31, 1921. Serial No. 457,460.

*To all whom it may concern:*

Be it known that I, ALBERT E. GREENE, a citizen of the United States, residing at Seattle, in the county of King and State of Washington, have invented certain new and useful Improvements in Electric Iron Processes, of which the following is a specification.

My present invention relates to the metallurgical treatment of iron or alloys of iron or similar metals, more particularly in furnaces having siliceous linings, and also to the control and regulation of the carbon content of the metal.

My present application is a division of my application for patent Serial No. 95,107, filed May 3, 1916.

My present invention is a process of treating metal, either while being melted or when molten, with a special slag comprising lime or a similar basic or alkaline-earth material, and carrying on this slag treatment in a furnace with a siliceous lining or hearth. The principal feature of my invention is the use of this special slag material together with a reducing agent.

One object of my invention is to regulate the carbon content by treatment of the metal with carbonaceous material added either with the charge or after the metal is melted; and this feature of my process provides for adding carbon to the metal in a new and useful manner, and also of controlling the carbon percentage in the metal,—that is by preventing loss of carbon by oxidation and also preventing undesirable taking on of carbon when that is desired.

My invention is essentially a deoxidizing process carried on in a furnace having a siliceous lining under a slag comprising lime and a reducing agent. When iron is melted the tendency of the carbon in the iron to oxidize, and also of the iron itself to oxidize, is strong and especially in furnaces heated by fuel combustion, and this tendency to oxidize causes trouble and delay and loss, and causes changes in composition so that it is difficult if not impossible to get the exact analysis aimed for. The oxidizing influences effect the carbon and also the metallic elements in the iron alloyed therewith. In processes as heretofore practised this loss of carbon during melting was made up for by the addition of pig iron later in the process and my present invention aims to control and regulate the carbon and deoxidize the metal in a simple and efficient manner suitable for use in acid lined furnaces, and I have found it possible to accomplish heretofore unexpected results by my process. I am able by my process to melt practically any grade of iron, from high carbon iron or gray iron down to iron with very low carbon including steel, and at the same time save the metal and elements therein from much of any change; I have been able to melt scrap iron and have the analysis of the metal after melting be almost identical in respect to carbon, manganese and silicon, with the analysis of the iron before melting, and do this by the process of my present invention.

In one modification my present process of this invention is used to remove sulphur from iron, and this is as far as I am aware, an unheard of procedure in acid lined furnaces.

My process may also be used to save manganese from oxidation where manganese containing metal such as ferro manganese or manganese steel is melted in an acid lined furnace.

I have discovered that the tendency of iron to oxidize when heated and melted in an acid lined furnace may be materially lessened by using lime in a slag on the molten iron, and that a fluid and easy melting slag could readily be formed by the use of a small amount of sand or silica with the lime, the slag meanwhile being subjected to reducing action of coke or carbon in suitable form. I have found that in the presence of such a slag the control of carbon becomes a simple matter. One fact on which my present invention is based is that lime in the slag on a bath of iron in an acid lined furnace makes it easier to reduce the oxide of iron present and thereby removes the agent which otherwise tends to attack and combine with the carbon and lower the percentage of the carbon in the iron. The important fact about my process is that it will operate satisfactorily in a furnace lined with siliceous or acid refractory material, and yet not hinder the process. In certain instances I use a slag addition of lime and reducing agent only, and in other instances use siliceous material with the lime.

I will first describe my process as it may be used for melting scrap iron to prevent oxidation and to raise the percentage of carbon in the metal. The charge may consist of a mixture of annealed malleable iron scrap and other scrap such as gray iron. The metal is charged into an electric furnace such as an arc furnace or an induction furnace, and in order to raise the carbon I prefer to charge along with the scrap a certain amount of crushed carbon, such as ground graphite electrodes. Either before starting the melting or after starting the melting I add a mixture of lime stone and silica sand and may use enough lime stone to give approximately equal parts of lime and silica in the slag materials added. As a deoxidizing agent I also add fine carbonaceous material either mixed with the lime and sand or else throw such deoxidizing agent on the slag. I may use alloys for deoxidizing if desired, such a ferro silicon or ferro manganese. The above treatment covers the metal with a reducing slag which prevents oxygen from getting at the metal and oxidizing it or the carbon. Under these conditions the metal readily takes up carbon. I control the amount of carbon taken up by the amount of carbon added in contact with the molten iron and when it is desired to limit the addition of carbon I may do this by adding carbonaceous material on top of the slag out of contact with the molten iron so as not to be absorbed by it. Thus I may use this process where my charge consists of malleable iron scrap largely in which there is not sufficient carbon to meet the specific analysis I may want, which might be some grade of white iron or gray iron containing more carbon than the scrap. But if the scrap metal has sufficient carbon to meet the specific analysis I want. I may then merely add the lime and silica slag and reducing agent.

Where the metal to be treated is already melted and where it has been under an oxidizing slag such oxidizing slag may be removed, and I may then treat the iron in the manner just described. If the carbon is added on the bare metal the metal will take it up; and if it is desired merely to protect the metal against oxidation then the carbon should be added on the slag. Metal may be treated after melting it or partly melting it in a combustion fired hearth furnace as set forth in my copending application for patent Sr. No. 254,224 filed Sept. 16, 1918, and the heating and melting may be finished by the process of my present invention to deoxidize and regulate the composition of the iron.

The use of the lime and silica slag treatment as described above together with a reducing agent and electric heat enables me to readily deoxidize the metal and I can use this process to desulphurize the metal. As far as I am aware it has never been practical or even possible to remove sulphur from iron in acid lined furnaces, for it was supposed to be dangerous to use lime. I have found that I can throw straight lime or limestone on a bath of iron and under reducing action from carbonaceous material such as fine carbon I can readily eliminate sulphur from the iron; and this in an acid lined furnace and at comparatively low molten iron temperatures. This is a great improvement since it permits the use of cheap furnace lining materials instead of the expensive basic dead burned magnesite or dolomite heretofore considered essential for sulphur removing processes. The operations which I am able to carry on at low temperatures by the process of this present invention form a very important part of it. At low temperatures of molten iron there is almost no wearing action on the acid lining which is not easy to take care of between heats by slight patching on the banks of the furnace and even in the case of treating manganese steel or other steel where I add lime alone on the bare metal surface, the repair of the furnace banks is even simpler and easier and less expensive than in basic furnaces where the same treatment is carried out.

For the removal of sulphur from iron I may throw on the metal a mixture of limestone and carbon crushed suitably fine. Or I may add lime alone and subject it to reducing action to get rid of any oxide of iron that might prevent reaction and removal of sulphur from the iron. Ordinarily however, I secure ample lowering of the percentage of sulphur in the metal if I use a slag mixture containing only about half lime and the remainder silica together with a suitable reducing agent. Where a straight lime slag is used on iron with a reducing agent, it may after the desired action on the sulphur in the iron, be taken out of the furnace by suitable rakes, and then a more easily melting lime silica slag may be used to replace the first slag and the metal may be finished by making any furnace additions of alloys like silicon and manganese.

Lime is not the only basic agent which I may use, but I may use in place of lime any similar alkaline earth oxide; or I may use other compounds of calcium like fluor spar with the lime and silica. I have found that a mixture of lime, 60%, sand 30% and fluor spar 10% will quickly take the sulphur out of molten iron in an electric furnace under reducing conditions and with an acid hearth. I may use straight alkali metal oxides such as soda or potash but these are more expensive. And the limestone used need not be pure but may contain magnesium oxide, and in fact I may use dolomite or magnesite in place of limestone.

The reducing agent may be mixed with the slag materials or added on top of them for purposes of getting reducing action, and carbonaceous material may be mixed with the charge to add to the carbon content thereof after melting as already described.

One special use to which I may put this process is the treatment of metal in molten condition immediately after treatment in an acid Bessemer converter to remove carbon or silicon from the metal by the blowing process, and then transfer it into an acid lined electric furnace and there deoxidize it and add the alloy additions. This combination results in a material saving over the Bessemer process alone, where there usually occurs a loss of 25% of the manganese in ferro manganese or spiegel added to deoxidize the metal. This treatment by my process may be applied whether much or little of the elements in the iron have been oxidized out by the Bessemer process, and for example iron could be blown to take the carbon down only a half a per cent or so and then transferred to an electric furnace and there deoxidized by the process of my present invention.

The advantages of my present invention are many, among them being cheaper furnace operation, less wear on linings, elimination of sulphur in acid furnaces, accurate control of composition, saving of metal, increased speed of operation and quicker deoxidation.

What I claim is:

1. The method of making iron or steel in an electric furnace having an acid lining, said method consisting in adding the ferrous metal charge to said furnace adding carbon with the charge, and then forming a slag comprising a non-ferrous basic slag forming material and silicia and subjecting the bath to reducing action under said slag.

2. The method of treating iron or steel in an electric furnace having a lining containing silicia in considerable proportion, said method consisting in adding the ferrous metal charge to the furnace and adding carbon with said charge and then forming a slag on top of the melted metal, said slag comprising silica and a non-ferrous basic slag-forming material, and finishing the metal under electric heat and reducing conditions under this slag.

3. The method of treating molten iron in an electric furnace having an essentially acid lining, said method consisting in applying a slag to the molten metal said slag comprising lime and silica in proportions to make a suitably fluid slag with silica in excess of lime, and treating said slag with a reducing agent to reduce iron oxide and deoxidize the metal while heating the metal electrically.

4. The process of treating iron or steel in an electric furnace having an essentially acid lining, said process consisting in applying to the metal a slag comprising a basic non-ferrous oxide like lime and silica, the silica being present in excess of the amount of such basic oxide, and while maintaining the metal and slag heated electrically subjecting the slag to the action of a solid reducing agent.

5. The process of melting iron or steel in an acid lined electric furnace, said process consisting in covering the metal with a slag comprising silica and a basic, non-ferrous oxide like lime, the silica being in excess, adding a solid carbonaceous reducing agent on the slag and continuing the reducing treatment under electric heat until the metal is sufficiently deoxidized.

6. The method of incorporating carbon with iron, said method consisting in providing an electric furnace with a suitable hearth containing silica, charging the metal to be melted together with solid carbonaceous material into the furnace, melting the charge electrically and meantime covering the melted metal with a slag comprising silica and a non-ferrous, basic oxide with respect to silica but in less proportion than silica and applying a reducing agent to this slag while heating it electrically.

7. The process of treating iron to incorporate carbon with it, said process consisting in melting the metal in a furnace with a siliceous lining by means of electricity, and adding carbonaceous material in contact with the iron and covering the melted metal with a slag containing silica and a non-ferrous, basic oxide under the influence of a reducing agent to reduce iron oxide therefrom.

8. The process of incorporating carbon with iron by melting the metal in contact with carbon in an acid lined electric furnace and treating the molten metal with a slag comprising silica and a basic oxide like lime and a reducing agent, while heating the metal electrically.

9. The process of increasing the carbon content of iron while molten said process consisting of adding on the molten iron a mixture of carbonaceous material together with slag materials comprising lime and silica the latter in greater proportion, and meantime heating the molten metal electrically and preventing oxidation while the metal takes on carbon.

10. The process of treating iron in an acid lined electric furnace, said process consisting in melting the iron, removing slag containing iron oxide, adding a mixture of carbonaceous material, limestone and silica in suitable proportions to prevent formation of oxide of iron and keeping the silica in excess of the lime in the final slag.

11. The process of treating iron which consists in subjecting it to oxidation in a suitable furnace and then transferring it into an acid lined furnace and there subjecting it to a slag comprising lime and silica and a reducing agent while heating it electrically.

12. The process which consists of heating iron by combustion heat in an acid lined hearth furnace to melt it, then removing the slag containing oxide of iron and replacing it with a slag comprising lime, silica and carbon and heating the iron electrically under such slag.

In witness whereof I hereunto subscribe my name this 28th day of March, A. D. 1921.

ALBERT E. GREENE.